United States Patent [19]

Goltsov et al.

[11] 4,063,937

[45] Dec. 20, 1977

[54] PALLADIUM-BASED ALLOY

[76] Inventors: Viktor Alexeevich Goltsov, ulitsa Karpinskogo, 25, kv. 257, Donetsk; Nikolai Ivanovich Timofeev, prospekt Lenina, 62, korpus 5, kv. 17; Sergei Grigorievich Guschin, ulitsa Sheinkmana, 45, kv. 148, both of Sverdlovsk, all of U.S.S.R.

[21] Appl. No.: 754,434

[22] Filed: Dec. 27, 1976

[51] Int. Cl.$^2$ ................................................ C22C 5/00
[52] U.S. Cl. ........................... 75/172 G; 75/134 F; 75/134 T; 55/16; 55/158
[58] Field of Search ............. 75/172 R, 172 E, 172 G, 75/134 R, 134 N, 134 F, 134 T; 55/16, 158

[56] References Cited

U.S. PATENT DOCUMENTS

| | | | |
|---|---|---|---|
| 3,713,270 | 1/1973 | Farr et al. | 55/158 X |
| 3,804,616 | 4/1974 | Goltsov et al. | 75/172 G |

*Primary Examiner*—M. J. Andrews
*Attorney, Agent, or Firm*—Lackenbach, Lilling & Siegel

[57] ABSTRACT

An alloy consists of 42.0 – 96.85% by weight of palladium 2.0 – 40.0% by weight of silver, 1.0 – 12.0% by weight of indium, 0.05 – 2.0% by weight of yttrium, 0.1 – 4.0% by weight of at least one element selected from the group consisting of niobium, molybdenum, tantalum, tungsten.

The alloy according to the invention exhibits high hydrogen permeability and strength properties which enable the operation of the alloy at elevated temperatures.

1 Claim, No Drawings

PALLADIUM-BASED ALLOY

The invention relates to non-ferrous metals production, and more particular to palladium-based alloys.

The present invention may be used in the manufacture of diffusion filters comprising foil or thin-walled capillary tubes employed for superfine purification of hydrogen and/or isotopes thereof, as well as for isolation of hydrogen isotopes from gas mixtures and subsequent separation thereof. In addition, the diffusion members made of the alloy according to the invention may be used in non-ferrous metals production for reducing oxides of non-ferrous, rare and refractory metals, in the manufacture of metal hydrides and in the semiconductor technology.

Apart from non-ferrous metals production, the palladium-based alloy according to the invention may be used in the following fields of technology:

In ferrous metal production, for the preparation of high purity hydrogen to be used as protective gas in the manufacture and treatment of magnetic materials and stainless steel.

In the chemical industry, for separation of gas mixtures, such as products of hydrocarbon conversion and purging gases from ammonia synthesis.

In the food industry, for fine purification of hydrogen to be used for hydration of animal and vegetable fats.

In the thermonuclear power production, for superfine purification and separation of hydrogen isotopes.

Further, the palladium-based alloy according to the invention can also be used in bringing the solution to the problem of environment protection: industrial wastes exhausted into atmosphere contain hydrogen as one of components thereof, and the existing methods for utilization of such wastes call for the employment of cryogenic technology using hydrogen-range temperatures. At the same time, if diffusion filters made of the alloy according to the invention are used, hydrogen can be separated by diffusion, and the process for the utilization and separation of residual gases offers no technical problems.

At present, palladium-based alloys are known to contain from 2 to 40% by weight of silver. Such two-component alloys are used for making hydrogen diffusion filters. The disadvantage of the known alloys consists in their low strength so that in operation in hydrogen-containing media such alloys are rapidly destructed.

Known in the art are palladium-based alloys containing, in addition, to silver, other elements of Group I of the Periodic system, as well as elements of Group VIII (iron, nickel, platinum, ruthenium). These alloys, while exhibiting elevated strength properties as compared with the above-mentioned two-component palladium-based alloy, have inadequate hydrogen permeability. Hydrogen permeability of these alloys for a membrane of 1 cm² surface area of 1 mm thickness at 500° C and with a pressure difference of 1 atm is less than $$1.1 - 10^{-2} \frac{cm^3(H_2)mm}{cm^2 \cdot s \cdot atm^{\frac{1}{2}}}$$

Also known in the art is a palladium-based alloy containing silver, gold, ruthenium and aluminum. This alloy exhibits high hydrogen permeability as compared with other known alloys. However, the disadvantage of this alloy is that it is unsuitable for operation at high temperatures (500°–600° C), and the hydrogen permeability of this alloy is inadequate for high-temperature gas mixture separation.

Known in the art are also palladium-based alloys containing yttrium and lanthanides. These alloys exhibit higher strength at 300°–350° C than palladium-based alloys containing silver.

Known in the art is a palladium based alloy containing in % by weight: silver — 2-40, indium — 1-12, yttrium — 0.05-2. This alloy exhibits high hydrogen permeability, but the strength properties thereof are comparatively low, and this alloy is unsuitable for operation at elevated temperatures.

Thus, all palladium-based alloys known heretofore and used as materials for hydrogen diffusion filters do not exhibit adequate strength and hydrogen permeability for efficient operation at elevated temperatures.

It is an object of the invention to eliminate the above-mentioned disadvantages.

It is an object of the invention to provide a palladium-based alloy which has high hydrogen permeability.

Another object of the invention is to provide a palladium-based alloy which exhibits high strength properties in combination with high hydrogen permeability and is suitable for operation at elevated temperatures.

These objects are accomplished by a palladium-based alloy containing silver, indium, yttrium, according to the invention additionally contains one or several of the following elements: niobium, molybdenum, tantalum or tungsten, the above components being used in the following quantities, in % by weight:

| | |
|---|---|
| silver | 2 – 40 |
| indium | 1 – 12 |
| yttrium | 0.05 – 2 |
| one and/or several elements: niobium, molybdenum, tantalum, tungsten | 0.1 – 4 |
| palladium | the balance |

The alloy according to the invention has the following properties:

| | |
|---|---|
| Ultimate strength (at room temperature) | 58 – 67 kgf/mm² |
| Yield point (at room temperature) | 34 – 39 kgf/mm² |
| Relative elongation (at room temperature) | 21 – 28% |
| Ultimate strength (at 700° C) | 40 – 48 kgf/mm² |
| Yield point (at 700° C) | 29 – 36 kgf/mm² |
| Relative elongation (at 700° C) | 7 – 12% |
| Hydrogen permeability at 700° C (foil of 1 dm² surface area, 0.1 mm thick, pressure difference - 1 - 4 atm) | $26.4 - 29.2 \frac{cm^3(H_2)mm}{dm^2 \cdot s \cdot atm^{\frac{1}{2}}}$ |

The alloy according to the invention containing silver, indium, yttrium and one or several elements selected from the group consisting of niobium, molybdenum, tantalum, tungsten exhibits strength properties which are by 10-35% better than the those of the known palladium-based alloy containing silver, indium and yttrium only.

Hydrogen permeability of the alloy according to the invention at 700° C overpasses hydrogen permeability of all palladium-based alloys known heretofore by 1.5-3 times.

Thus, repeated thermocycling of a foil made of the alloy according to the invention (0.1 mm thick, size:

5×50 mm) in a special test installation (from 20° to 700° C) did not result in dimensional changes of the foil, whilst the X-ray structural analysis could not reveal the presence of second hydride phase in the alloy even after 1000 thermal cycles. Continuous operation of diffusion members made of the alloy according to the invention, at 700° C confirmed the possibility of using the alloy at this temperature, and subsequent metallographic analysis did not reveal any changes in the microscopic structure: monophase fine-grain structure of solid solution was intact after 1000 hours of tests.

Further objects and advantages of the invention will become apparent from the following detailed description of the palladium-based alloy and embodiments thereof.

It is contemplated to alloy the palladium-based alloy containing silver, indium, yttrium, with one or several elements selected from the group consisting of tungsten, molybdenum, niobium, tantalum.

Due to the addition of the above-mentioned elements to the palladium-based alloy, hydrogen permeability and strength properties of the alloy are improved, and admissible temperature is increased.

It should be noted that the role and importance of individual alloying elements are as follows:

Silver is an element which is widely used in making alloys for hydrogen filters which is due to the fact that silver improves hydrogen permeability of the alloy which varies with an increase of silver content in accordance with the extremum law. In combination with indium, yttrium and at least one of refractory elements from the group including tungsten molybdenum, niobium, tantalum, silver content should be within the range from 2 to 40% by weight. Where silver content is lower than 2% by weight, the addition thereof is inefficient, and silver content of over 40% by weight in an alloy results in reduced hydrogen permeability of the alloy.

Indium is an analog of silver and results in changes of hydrogen permeability of the palladium-based alloy in accordance with the extremum law, but with the percentage which is lower than the silver content in the alloy. In addition, indium is a very efficient agent adding strength to palladium.

In this respect, the use of indium in the alloy has proved efficient in quantities from 1 to 12% by weight. Indium used in the alloy in an amount less than 1% by weight is inefficient, and if over 12% by weight — it will result in reduced hydrogen permeability.

Known in the art are palladium-based alloys containing yttrium substantially up to 12% by weight. It has been, however, found that the use of yttrium for complex alloying in such quantities and in combination with silver results in material reduction of the operational properties of the alloy. The addition of yttrium in an amount of 0.05-2% by weight provides for improvement of mechanical properties and performance of the alloy. Yttrium used in the above-mentioned proportions enables an increase in the alloy strength, reduction of gas content during casting, and, which is especially important, it results in all the above positive effects without negatively affecting hydrogen permeability of the alloy. The use of yttrium in quantities lower than 0.05% by weight cannot bring about any positive result, while the use of more than 2% by weight of yttrium results in impaired performance of the alloy.

The use of one or several elements selected from the group consisting of tungsten, molybdenum, niobium and tantalum in an amount of 0.1-4% by weight in the palladium-based alloy, in combination with silver and yttrium was made for the first time.

From the point of view of the influence on the properties of the palladium-based alloy for making diffusion filters for hydrogen, tungsten, molybdenum, niobium and tantalum are analogs. Therefore, these elements may be used both separately or in combination.

All the above-mentioned elements added to the alloy improve its strength, shift the temperature range of recrystallization into the zone of higher temperatures (750°-800° C) and provide for opportunity of efficiently operating the alloy according to the invention at up to 700° C. The selected content of at last one element from the group consisting of refractory metals including molybdenum, niobium, tungsten and tantalum in the alloy in an amount of 0.1-4% by weight, in combination with specially proportioned other components-silver (2-40% by weight), indium (1-12% by weight) and yttrium (0.05-2% by weight) — provides for optimum combination of high hydrogen permeability of the alloy with high strength properties thereof and enables stable operation of the alloy at elevated temperatures.

It should be noted that the alloy with the selected content of alloying elements can be successfully operated also at lower temperatures (300°-600° C). In such applications, high strength properties of the alloy offer an opportunity of operation under high pressure thus raising the throughput capacity of diffusion filters.

The alloy can even be used at 800°-850° C. However, the operation in this temperature range requires reinforcement of diffusion members so as to lower specific load and reduce creepage.

The use of refractory elements in the alloy separately or in combination should be effected within the range from 0.1 to 4% by weight. This is due to the fact that the content thereof less than 0.1% by weight would not result in strengthening the alloy, whereas with greater content of these elements plastic treatment of the alloy becomes more difficult, and hydrogen permeability of the alloy becomes inadequately low.

Therefore, it is the use of at least one element from the group consisting of tungsten, molybdenum, niobium and tantalum in an amount of 0.1-4% by weight in the alloy, in combination with silver (2-40% by weight), indium (1-12% by weight) and yttrium (0.05-2% by weight) that provides the accomplishment of the object of the invention to obtain palladium-based alloy exhibiting high hydrogen permeability and strength properties. The alloy can be operated at elevated temperatures.

EXAMPLE 1

An alloy consisting of 2% by weight of silver, 12% by weight of indium, 2% by weight of yttrium, 4% by weight of tungsten, palladium being the balance, and an alloy consisting of 2% by weight of silver, 12% by weight of indium, 2% by weight of yttrium, 4% by weight of niobium, palladium being the balance, were melted in an induction furnace in an argon atmosphere.

The ingots were hammered and homogenized at 1000° C for 3 hours, and then 0.5 mm wire and 0.1 mm strip were made.

The wire was tested on the Inston tensile-testing machine with automatic recording of tensile diagram by means of a potentiometer. Samples having a design length of 100 mm were tensioned at a rate of 10 mm per minute. Ultimate strength ($\sigma_b$), conventional yield point ($\sigma_{02}$) and relative elongation ($\delta$) were determined from the tensile diagram.

The wire tests at room temperature revealed that the alloys of the above compositions had practically identical mechanical properties: ultimate strength $(\sigma_b)_{20°C}$ = 65 kgf/mm² and yield point $\sigma_{02}$ = 38 kgf/mm² which were by 25-26% better than ultimate strength and yield point of an alloy of identical composition containing no tungsten and niobium. Relative elongation of the resultant alloys was sufficiently high $(\delta)_{20°C}$ = 20%. Then the alloys were tested at 700° C. For that purpose, diffusion members were made in the form of bags (of 0.1 mm foil) with tubes welded therein. Such diffusion members were used for isolation of high purity hydrogen from technical hydrogen at 700° C at a pressure difference from 4 to 1 atm. The diffusion member showed a good performance and had the specific throughput capacity of $$26.9 \frac{cm^3(H_2)}{dm^2 \cdot s}.$$

The diffusion member withstood repeated heating and cooling at operating temperature.

EXAMPLE 2

An alloy consisting of 40% by weight of silver, 1.0% by weight of indium, 0.05% by weight of yttrium, 2.0% by weight of niobium, 2% by weight of molybdenum, palladium being the balance, was melted, treated and tested as described in Example 1.

The mechanical properties of the alloy at room temperature were $(\sigma_b)_{20°C}$ = 63 kgf/mm², $(\sigma_{02})_{20°C}$ = 37 kgf/mm² and $(\sigma)_{20°C}$ = 26%.

Thus, the strength properties of the alloy were by 31-32% better than of the alloy of identical composition containing no niobium and molybdenum.

Deuterium permeability tests at 700° C (0.1 mm foil at a pressure difference of from 9 to 1 atm) showed that the specific throughput capacity was 28.1 cm³(H₂)dm²·s.

EXAMPLE 3

Palladium-based alloy containing 73.7% by weight of palladium, 20% by weight of silver, 4.0% by weight of indium, 0.5% by weight of yttrium, 1.0% by weight of tungsten, 0.8% by weight of tantalum was treated and tested in conditions described in Examples 1, 2. The alloy had the following properties: $(\sigma_b)_{20°C}$ = 64 kgf/mm², $(\sigma_{02})_{20°C}$ = 36 kgf/mm², $(\sigma)_{20°C}$ = 28%. Comparison of the strength properties of this alloy and an alloy of identical composition containing no tungsten and tantalum showed that the strength properties of the alloy were improved by 11-12%.

Specific throughput capacity of the alloy according to Example 3 at 700° C was 26.4 cm³(H₂)dm²·s, that is better than for an alloy containing no niobium and molybdenum at 500° C.

EXAMPLE 4

An alloy consisting of 15% by weight of silver, 7% by weight of indium, 1.0% by weight of yttrium, 0.1% by weight of molybdenum, palladium being the balance, and an alloy containing 15% by weight of silver, 7% by weight of indium, 1.0% by weight of yttrium, 0.1% by weight of tantalum, palladium being the balance, had the following properties after the tests at room temperature: $(\sigma)_{20°C}$ = 58 kgf/mm², $(\sigma_{02})_{20°C}$ = 34 kgf/mm², $(\sigma)_{20°C}$ = 28%.

Specific throughput capacity of the alloy at 700° C determined in conditions described in Example 1 was 27.5 cm³(H₂)dm²·s.

EXAMPLE 5

Palladium-based alloy was melted and treated in the conditions described in Examples 1-4, with the following composition: 15% by weight of silver, 2.0% by weight of indium, 0.2% by weight of yttrium, 3.4% by weight of tantalum, 0.5% by weight of molybdenum, palladium being the balance.

After making wire of the above alloy, the wire was repeatedly tested to determine the mechanical strength at room temperature and at elevated temperatures. The room temperature tests were conducted as described in Example 1. Ultimate strength, yield point and relative elongation at elevated temperatures were determined by tensioning heated samples in a furnace mounted on the Inston testing machine. Uniformity of temperature field in the furnace was controlled by means of a platinum/rhodium/platinum thermocouple.

0.5 mm diameter and 50 mm long samples were allowed to stay in the furance at each temperature value for two minutes before the test. The experiments showed that these conditions proved to be adequate for establishment of a pre-set temperature after the introduction of clamps with a sample in the furnace which was preheated at a desired temperature.

The alloy had the following mechanical properties: $\sigma_b$ = 63 kgf/mm² at 20° C; $\sigma_b$ = 58 kgf/mm² at 600° C; and $\sigma_b$ = 48 kgf/mm² at 700° C; $(\sigma_{02})_{20°C}$ = 39 kgf/mm²; $(\sigma_{02})_{600°C}$ = 44 kgf/mm²; $(\sigma_{02})_{700°C}$ = 36 kgf/mm².

It is noted that the alloy exhibited a good plasticity ($\sigma$ = 12-7%) at elevated temperature.

Specific throughput capacity of the alloy at 700° C as measured with 0.1 mm foil at a pressure difference of 1-4 atm was 27-29 cm³(H₂)dm²·s.

EXAMPLE 6

An alloy containing 15% by weight of silver, 5.0% by weight of indium, 0.3% by weight of yttrium, 1.2% by weight of tantalum, 0.5% by weight of niobium, palladium being the balance, was melted and treated in the conditions described in Examples 1-4.

A wire made of the above alloy was repeatedly tested to determine the mechanical properties at room temperature and at elevated temperatures. The room temperature tests were conducted as described in Example 1. Ultimate strength, yield point, and relative elongation at elevated temperatures were determined by tensioning heated samples in a furnace mounted on the Inston testing machine. Uniformity of temperature field in the furnace was controlled by means of a platinum/rhodium/platinum thermocouple.

0.5 mm diameter and 50 mm long samples were allowed to stay in the furnace for 2 minute at each temperature value. The experiments showed that these conditions proved to be adequate for establishing a pre-set temperature after introduction of clamps with a sample in the furnace preheated at a desired temperature.

The alloy showed the following properties: $(\sigma_b)_{20°C}$ = 62 kgf/mm²; $(\sigma_b)_{600°C}$ = 55 kgf/mm²; $(\sigma_b)_{700°C}$ = 43 kgf/mm²; $(\sigma_{02})_{20°C}$ = 37 kgf/mm²; $(\sigma_{02})_{600°C}$ = 39 kgf/mm²; $(\sigma_{02})_{700°C}$ = 29 kgf/mm².

It is noted that the alloy exhibited a good plasticity at elevated temperature ($\delta = 12-7\%$).

Specific throughout capacity of the alloy at 700° C as measured with 0.1 mm foil at a pressure difference of 1-4 atm was $$27 - 29 \frac{cm^3(H_2)}{dm^2 \cdot s \cdot}$$

EXAMPLE 7

An alloy consisting of palladium as the base, 10% by weight of silver, 8% by weight of indium, 1.0% of weight of yttrium, 0.2% by weight of niobium, 2.0% by weight of tungsten was melted and treated in the conditions described in Examples 1-4.

A wire made of this alloy was repeatedly tested to determine the mechanical properties at room temperature and at elevated temperatures. The room temperature tests were conducted as described in Example 1. Ultimate strength, yield point and relative elongation at elevated temperatures were determined by tensioning heated samples in a furnace mounted in the Inston testing machine. Uniformity of temperature field in the furnace was controlled by means of a platinum/rhodium/platinum thermocouple.

0.5 diameter and 50 mm long samples were allowed to stay in the furnace for 2 minutes at each temperature value before the test. The experiments showed that these conditions proved to be adequate for establishment of a pre-set temperature after introduction of clamps with a sample in the furnace preahated at a desired temperature.

The alloy exhibited the following properties:
$(\sigma_b)_{20°C} = 67$ kgf/mm²; $(\sigma_b)_{600°C} = 58$ kgf/mm²;

$(\sigma_b)_{700°C} = 48$ kgf/mm²; $(\sigma_{02})_{20°C} = 39$ kgf/mm²;

$(\sigma_{02})_{600°C} = 40$ kgf/mm²; $(\sigma_{02})_{700°C} = 35$ kgf/mm²;

The alloy exhibited a good plasticity at elevated temperature ($\delta = 12-7\%$).

Specific throughout capacity of the alloy at 700° C as measured with 0.1 mm foil at a pressure difference of 1-4 atm as $$27 - 29 \frac{cm^3(H_2)}{dm^2 \cdot s \cdot}$$

EXAMPLE 8

An alloy consisting of palladium as the base, 20% by weight of silver, 3% by weight of indium, 0.1% by weight of yttrium, 0.8% by weight of molybdenum, 1.0% by weight of tungsten was melted and treated as described in Examples 1-4.

A wire made of the above alloy was repeatedly tested to determine the mechanical properties at room temperature and at elevated temperatures. The room temperature tests were conducted as described in Example 1. Ultimate strength, yield point and relative elongation at elevated temperatures were determined by tensioning heated samples in a furnace mounted on the Iston testing machine. Uniformity of temperature field in the furnace was controlled by means of a platinum/rhodium/platinum thermocouple.

0.5 mm diameter and 50 mm long samples were allowed to stay in the furnace for two minutes at each temperature value before the test. The experiments showed that these conditions proved to be adequate for establishment of a pre-set temperature after introduction of clamps with a sample in the furnace preheated at a desired temperature.

The alloy had the following properties: $(\sigma)_{20°C} = \sigma = 58$ kgf/mm²; $(\sigma_b)_{600°C} = 46$ kgf/mm²; $(\sigma_b)_{700°C} = \sigma = 40$ kgf/mm²; $(\sigma_{02})_{20°C} = 35$ kgf/mm²; $(\sigma_{02})_{600°C} = \sigma = 36$ kgf/mm²; $(\sigma_{02})_{700°C} = 30$ kgf/mm².

It is noted that the alloy exhibited a good plasticity at elevated temperature ($\delta = 12-7\%$).

Specific throughput capacity of the alloy at 700° C as measured with 0.1 mm foil at a pressure difference of 1-4 atm was $27-\sqrt{}$cm³(H₂)·dm²·s.

What is claimed is:

1. Palladium-based alloy consisting of 42.0–96.85% by weight of palladium 2–40% by weight of silver, 1–12% by weight of indium, 0.05–2% by weight of yttrium, 0.1–4% by weight of at least one element selected from the group including niobium, molybdenum, tantalum, tungsten.

* * * * *